Dec. 7, 1948.  R. A. MONKIEWICZ  2,455,793
CARRIAGE STOP
Filed July 10, 1947  2 Sheets-Sheet 1
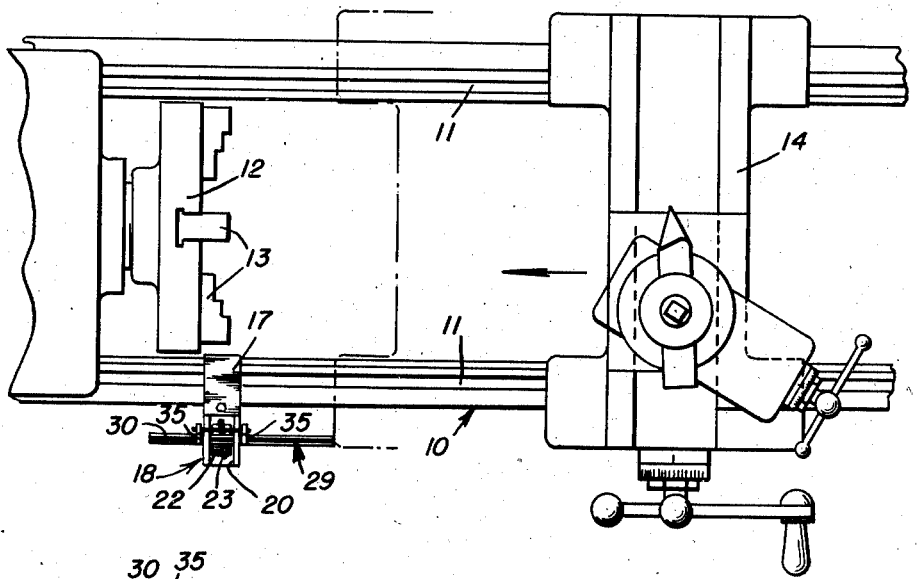
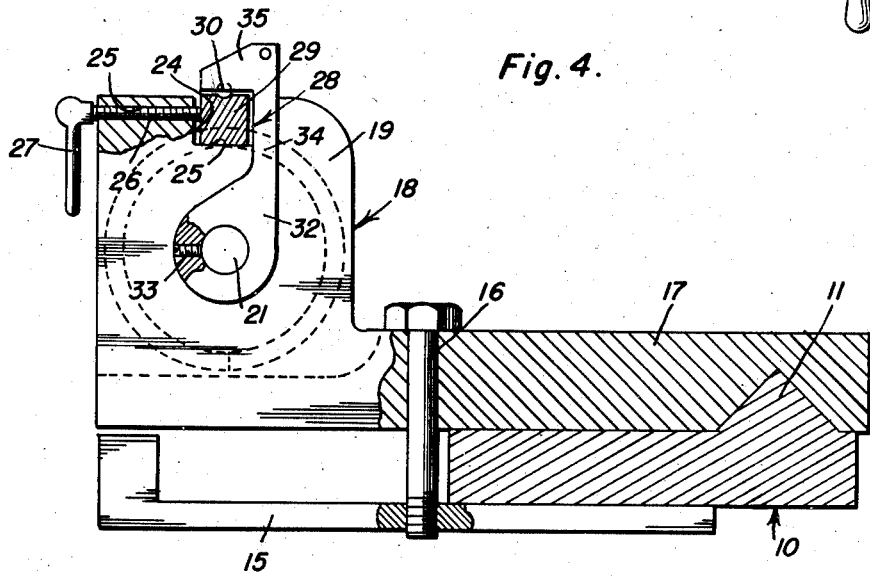
Inventor
Rudolf A. Monkiewicz Dec. 7, 1948.     R. A. MONKIEWICZ     2,455,793
CARRIAGE STOP
Filed July 10, 1947                    2 Sheets-Sheet 2
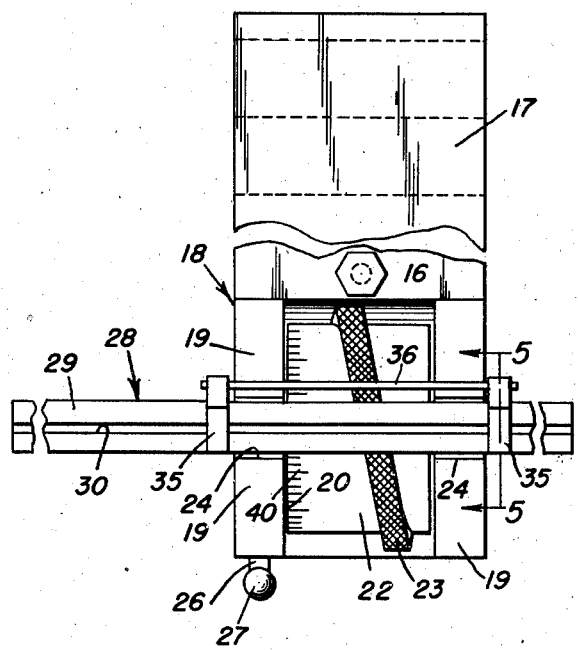
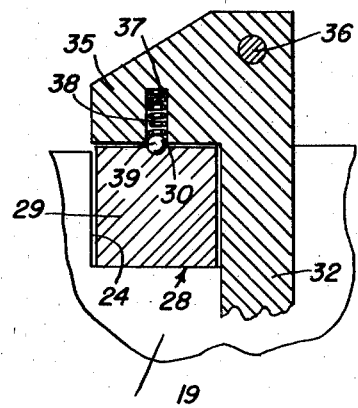
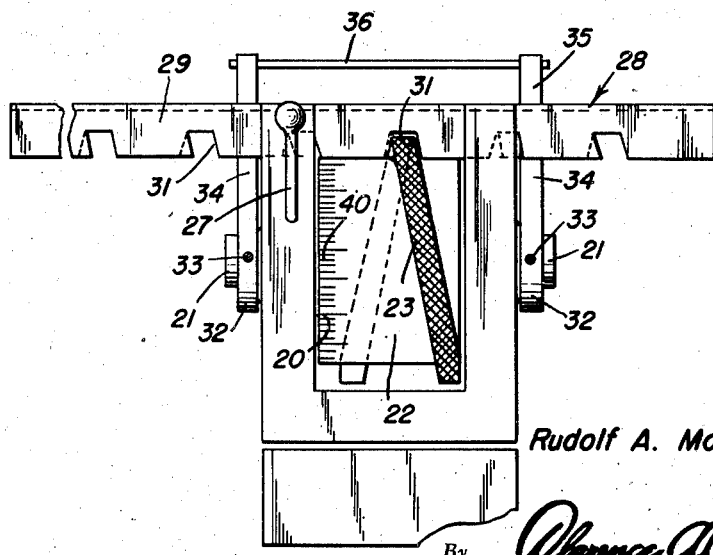
Inventor
Rudolf A. Monkiewicz Patented Dec. 7, 1948

2,455,793

UNITED STATES PATENT OFFICE 2,455,793

CARRIAGE STOP

Rudolf A. Monkiewicz, North Tonawanda, N. Y.

Application July 10, 1947, Serial No. 760,154

3 Claims. (Cl. 82—21)

This invention relates to a carriage stop adapted to be clamped to the bed of a lathe and has for its primary object to limit the advance of the tool carriage of the lathe toward the face plate thereof.

Another object is to enable the tool of the lathe to be properly positioned with relation to the work and to facilitate the setting up of jobs in the lathe.

Among its features my invention embodies a bracket adapted to be clamped to the bed of a lathe, a stop bar mounted in the bracket to move along an axis which lies parallel with the longitudinal axis of the lathe bed, said stop bar lying in the path of movement of the tool carriage of the lathe and adapted to limit the advance of the tool carriage toward the face plate of the lathe and means carried by the bracket to lock the stop bar in various adjusted positions relative to the bracket.

Other features include providing in the stop bar a plurality of longitudinally spaced notches, mounting a drum in the bracket to rotate about an axis which lies parallel to the longitudinal axis of the stop bar, and a spiral rib on the periphery of the drum for entrance into successive notches in the stop bar to move the stop bar along its longitudinal axis when the drum is rotated.

Still other features include providing in the bracket a longitudinal groove through which the stop bar moves, a stop bar retainer pivoted to each end of the bracket for engagement with the stop bar releasably to retain it in the groove and means to hold the bar retainers in stop bar engaging position.

In the drawings:

Figure 1 is a fragmentary top plan view of the lathe illustrating this improved carriage stop in place thereon;

Figure 2 is an enlarged plan view of the carriage stop illustrated in Figure 1;

Figure 3 is a front view in elevation of the carriage stop illustrated in Figure 2;

Figure 4 is a side view of the carriage stop illustrating it mounted on a lathe bed, certain portions being shown in section more clearly to illustrate certain details of construction; and Figure 5 is a fragmentary enlarged sectional view taken substantially along the line 5—5 of Figure 2.

Referring to the drawings in detail a lathe designated generally 10 is provided with a bed having longitudinally extending ways 11, and mounted for rotation adjacent one end of the lathe bed is a conventional face plate 12 carrying conventional work clamps 13 in which the work is supported in operative position on the face plate. Mounted for longitudinal sliding movement on the ways 11 is a conventional tool carriage 14 which is adapted to advance toward the face plate 12, or be moved away therefrom along the ways 11.

Clamped as by a clamping plate 15 and a clamp screw 16 to the bed 10 of the lathe is a base plate 17 of a bracket designated generally 18. Formed at one end of the base plate 17 is a head 19 which is slotted as at 20 to form a pair of spaced parallel upstanding arms which are pierced with aligning openings for the reception of a spindle 21, the axis of which lies parallel with the longitudinal axis of the bed of the lathe. Mounted for rotation on the spindle within the slot 20 is a drum 22 carrying on its periphery a spiral rib 23 the outer peripheral surface of which is preferably knurled. Extending through the head 19 above and in parallel relation with the spindle 21 is a groove 24 the bottom wall 25 of which lies in a plane which lies tangent to the periphery of the drum 22, and formed in one of the ears formed by the slot 20 is an internally screw threaded aperture 25 for the reception of the threaded shank 26 of a clamp screw which cooperates with the opposite wall of the slot 24 in clamping a stop bar to be more fully hereinafter described in place. The screw 26 is provided with a suitable handle 27 by which it may be rotated.

Seated in the groove 24 is a stop bar designated generally 28 comprising an elongated body which is substantially square in cross section designated 29 and formed in one side of said body is a longitudinal groove 30 the purpose of which will be more fully hereinafter explained. Formed in the face of the body opposite the groove 30 is a row of longitudinally spaced transversely extending notches or grooves 31 which lie along angles corresponding to the pitch angle of the rib 23, and when the stop bar 28 lies in the groove 24 the rib 23 engages in a groove 31 so that as the drum 22 is rotated the stop bar may be moved longitudinally through the slot 24. It will be understood of course that the distance between the grooves or notches 31 is such that before the rib 23 leaves one of the grooves or notches 31 it will have entered an adjacent groove or notch 31, thus permitting the bar to be fed from one end to the other by rotation of the drum 22 and without perceptible interruption when the spiral rib 23 leaves one notch and enters the other.

In order to hold the stop bar 28 against accidental shifting, once it has been adjusted by rotation of the drum 22 I support at opposite ends of the spindle 21 yokes 32 which are secured in place by suitable set screws 33 and are provided with upwardly extending arms 34 having hook-shaped heads 35 which are adapted to overlie the upper grooved surface of the body 29 as will be readily understood upon reference to Figures 4 and 5. The ends of the arms 34 opposite those which are coupled to the spindle 21 are joined by a cross bar 36, and formed in each head is a recess 37 which extends inwardly from the face of the head which overlies the grooved face of the bar 29, and seated in each recess 37 is a compression coil spring 38 which bears on a detent 39 in order frictionally to hold the stop bar 28 in proper position within the groove 24.

In use the carriage stop is clamped on the bed of the lathe in approximately the position in which the carriage 14 is to be arrested. The clamp screw 26 is loosened and upon rotating the drum 22 it will be evident that the stop bar 28 may be moved longitudinally within the head 18 to the desired position. It is preferred that the drum 22 be provided with suitable graduations 40 which are adapted to cooperate with any suitable reference point on the head 18, such as the forward edge of the adjacent notch 24 in obtaining the adjustment desired. When the rod or stop bar 28 has been properly adjusted, the clamp screw 26 is turned by rotating the handle 27 to move the point thereof into clamping engagement with a side of the stop bar 28 in order to lock the bar against further movement.

By the use of the carriage stop it is obvious that the tool carriage 14 may be advanced toward the face plate 12 of the lathe until it encounters the end of the stop bar 28, and an extremely accurate adjustment of the motion of the carriage may be had by simply rotating the drum 22 to bring the tool into proper relationship with the work in the lathe.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A carriage stop for a lathe comprising a bracket adapted to be clamped to the bed of a lathe, said bracket having a groove opening through its top and extending therethrough in parallel relation to the longitudinal axis of the lathe bed, a drum mounted in the bracket to rotate about an axis which lies parallel to the groove, the periphery of the drum lying tangent to the plane of the bottom of the groove, a stop bar movable longitudinally through the groove, said stop bar having longitudinally spaced notches in its underside, a spiral rib extending outwardly from the drum for entrance into successive notches in the stop bar whereby when the drum is rotated the stop bar will be moved along its longitudinal axis and a bar retainer pivoted to each end of the bracket for engagement with the stop bar releasably to retain it in the groove.

2. A carriage stop for a lathe comprising a bracket adapted to be clamped to the bed of a lathe, said bracket having a groove opening through its top and extending therethrough in parallel relation to the longitudinal axis of the lathe bed, a drum mounted in the bracket to rotate about an axis which lies parallel to the groove, the periphery of the drum lying tangent to the plane of the bottom of the groove, a stop bar movable longitudinally through the groove, said stop bar having longitudinally spaced notches in its underside, a spiral rib extending outwardly from the drum for entrance into successive notches in the stop bar whereby when the drum is rotated the stop bar will be moved along its longitudinal axis, a bar retainer pivoted to each end of the bracket for engagement with the stop bar releasably to retain it in the groove, and means to move the bar retainers in unison into and out of bar engaging position.

3. A carriage stop for a lathe comprising a bracket adapted to be clamped to the bed of a lathe, said bracket having a groove opening through its top and extending therethrough in parallel relation to the longitudinal axis of the lathe bed, a drum mounted in the bracket to rotate about an axis which lies parallel to the groove, the periphery of the drum lying tangent to the plane of the bottom of the groove, a stop bar movable longitudinally through the groove, said stop bar having longitudinally spaced notches in its underside, a spiral rib extending outwardly from the drum for entrance into successive notches in the stop bar whereby when the drum is rotated the stop bar will be moved along its longitudinal axis, a bar retainer pivoted to each end of the bracket for engagement with the stop bar releasably to retain it in the groove, said stop bar having a longitudinal groove in its exposed face and a spring pressed detent carried by each retainer for engagement in the groove in the bar to hold its respective retainer in bar retaining position.

RUDOLF A. MONKIEWICZ.

REFERENCES CITED

The following references are of record in the file of this patent:

UNITED STATES PATENTS

| Number | Name | Date |
| --- | --- | --- |
| 1,401,669 | Calhoun | Dec. 27, 1921 |
| 1,480,522 | Ferguson | Jan. 8, 1924 |
| 1,582,077 | Palmer | Apr. 27, 1926 |